UNITED STATES PATENT OFFICE.

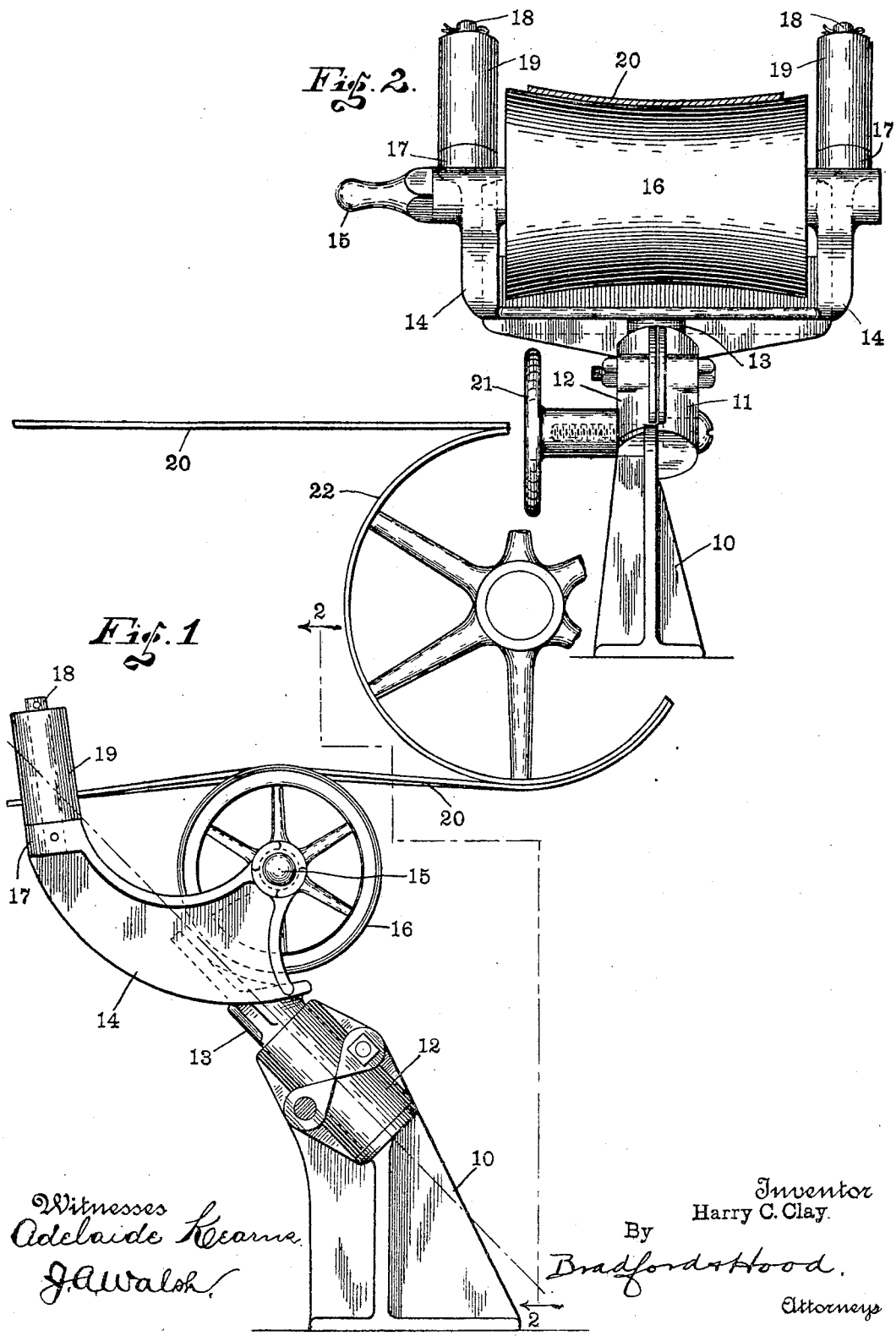

HARRY C. CLAY, OF COLUMBUS, INDIANA, ASSIGNOR TO REEVES & COMPANY, OF COLUMBUS, INDIANA, A CORPORATION OF INDIANA.

BELT-GUIDE.

No. 795,269.    Specification of Letters Patent.    Patented July 25, 1905.

Application filed March 13, 1905. Serial No. 249,903.

*To all whom it may concern:*

Be it known that I, HARRY C. CLAY, a citizen of the United States, residing at Columbus, in the county of Bartholomew and State of Indiana, have invented certain new and useful Improvements in Belt-Guides, of which the following is a specification.

In the operation of threshing and other similar machines it is common to drive the machine by means of an endless belt of considerable length and an engine set some distance from the machine. Difficulty is experienced in getting the driving-pulley of the engine in exact alinement with the driven pulley of the machine, and it is necessary to provide some means for properly guiding the driving-belt in order to compensate for the lack of accurate alinement for the two pulleys.

The object of my present invention is to provide an adjustable guide for this purpose.

The accompanying drawings illustrate my invention.

Figure 1 is a side elevation of my improved device shown in connection with the driven pulley of a machine and a portion of the driving-belt. Fig. 2 is an end elevation on line 2 2 of Fig. 1.

In the drawings, 10 indicates a suitable standard provided at its upper end with a socket member 11 and cap 12, which together form a cylindrical socket, which is preferably arranged inclined at about the angle shown, although the exact angle is wholly immaterial. The socket formed by the parts 11 and 12 is adapted to receive a stud 13, which forms part of the idler-carrier 14. Journaled in the carrier 14 upon a suitable shaft 15, arranged at right angles to the axis of stud 13 and to one side thereof, is an idler 16. Forming a part of the idler-carrier 14 are two upwardly and forwardly extending fingers 17 17, each of which carries a pin 18, upon which is journaled a guide-roller 19, these rollers being adapted to be brought temporarily into engagement with the edges of the belt 20 when the idler-carrier 14 is swung about the axis of its pin 13. The arrangement of the pins 18 is such that a line drawn between the two pins 18 in the plane of the belt 20 will be intersected (or practically so) by the extended axis of the pin 13. The carrier 14 may be held in any position of adjustment by means of a suitable clamping-nut 21, which operates against the cap 12 in the usual well-known manner, this nut being omitted from Fig. 1 for the sake of clearness.

In operation the driving-belt 20 passes around the driven pulley 22 and passes over and engages the idler 16. If the driving-pulley (not shown) is in exact alinement with the pulley 22, the axis of the shaft 15 will be arranged in exact parallelism with the axis of the pulley 22, and the belt 20 will pass between the two rollers 19 without engaging them. If, however, the alinement of the driving and driven pulleys is not correct, the idler-carrier 14 may be swung upon stud 13, thus swinging the idler 16 so that its axis 15 is not only out of parallelism with the driven shaft, but is also tipped from horizontal, thus shifting the belt to one side or the other on the driven pulley 20. By arranging the stud 13 so that its axis will intersect the plane of the axes of the rollers 19 at substantially the plane of the belt the idlers 19 will only temporarily engage the edge of the belt when the idler 16 is tipped out of parallelism with the axis of the driven pulley.

By arranging the parts in the particular relation described it will be noted that when the idler is shifted it is thrown out of parallelism with the driven shaft in such way as to operate to shift the belt transversely on the driven pulley in the desired direction and that the guide-rollers are merely precautionary elements which may possibly strike the edge of the belt at the exact time of shifting, but which do not hold the belt in its shifted position, this being accomplished by a change position of the idler.

I claim as my invention—

1. A belt-guide consisting of a suitable standard, an idler-carriage journaled thereon, an idler journaled on said carriage, a pair of guide-rollers carried by said carriage to one side of the idler, the axis of the journaled connection between the carriage and standard passing to one side of the axis of the idler and intersecting the plane of the axes of the guide-rollers substantially in the plane of the belt, and means for holding the idler-carriage in various positions of angular adjustment on the standard.

2. A belt-guide consisting of a suitable standard provided with an inclined pin-socket, an idler-carriage having a pin journaled in said socket, an idler journaled in said carriage to one side of the axis of the said pin, a pair of guide-rollers journaled on said carriage on axes at an angle to the axis of the idler and at opposite sides of the belt-line, and the axes of said guide-rollers lying in a plane which is intersected by the pin-axis substantially in the belt plane.

In witness whereof I have hereunto set my hand and seal, at Indianapolis, Indiana, this 6th day of March, A. D. 1905.

HARRY C. CLAY. [L. S.]

Witnesses:
ARTHUR M. HOOD,
JAMES A. WALSH.